(12) United States Patent
Derenes et al.

(10) Patent No.: US 8,585,352 B2
(45) Date of Patent: Nov. 19, 2013

(54) TURBOJET NACELLE

(75) Inventors: Jacky Raphael Michel Derenes, Corebeil-Essonnes (FR); Delphine Dijoud Lambert, Paris (FR); Christophe Claude Philippe Nouhaud, Brie Comte Robert (FR)

(73) Assignee: SNECMA, Paris (FR)

( * ) Notice: Subject to any disclaimer, the term of this patent is extended or adjusted under 35 U.S.C. 154(b) by 505 days.

(21) Appl. No.: 12/967,849

(22) Filed: Dec. 14, 2010

(65) Prior Publication Data

US 2011/0142608 A1    Jun. 16, 2011

(30) Foreign Application Priority Data

Dec. 16, 2009  (FR) ...................................... 09 59061

(51) Int. Cl.
*F01D 25/24*      (2006.01)
(52) U.S. Cl.
USPC .......................... 415/127; 415/201; 415/214.1
(58) Field of Classification Search
USPC ...................... 415/126, 127, 128, 201, 214.1; 60/796–798; 244/53 R, 110 B, 129.4
See application file for complete search history.

(56) References Cited

U.S. PATENT DOCUMENTS 5,372,338 A * 12/1994 Carlin et al. .................... 244/54

FOREIGN PATENT DOCUMENTS

| EP | 1 902 952 A1 | 3/2008 |
| EP | 1 985 537 A2 | 10/2008 |
| EP | 1 998 012 A2 | 12/2008 |
| GB | 2 202 588 A | 9/1988 |

OTHER PUBLICATIONS

French Preliminary Search Report issued Jul. 28, 2010, in France 09 59061, filed Dec. 16, 2009.

* cited by examiner

*Primary Examiner* — Edward Look
*Assistant Examiner* — Maxime Adjagbe
(74) *Attorney, Agent, or Firm* — Oblon, Spivak, McClelland, Maier & Neustadt, L.L.P.

(57) ABSTRACT

The invention provides a nacelle for a bypass turbojet, the nacelle comprising: an aerodynamic fairing; a maintenance cover fastened to the aerodynamic fairing by means of at least one connection hinged about a longitudinal axis of the nacelle; a cold stream inner shroud and a cold stream outer shroud placed concentrically inside the aerodynamic fairing so as to define between them a flow passage for a cold stream, the inner shroud having at least one opening closed by a removable access hatch; and the outer shroud includes at least one opening closed by a removable access hatch that is fastened on the maintenance cover.

7 Claims, 2 Drawing Sheets

TURBOJET NACELLE

BACKGROUND OF THE INVENTION

The present invention relates to the general field of nacelles fitted to bypass turbojets, and it relates more particularly to nacelles that are mounted on the fuselage of an airplane.

The nacelle of a bypass turbojet comprises in particular an aerodynamic fairing that is fastened to the airplane or on the engine and that includes one or more maintenance covers, a cold stream outer shroud placed inside the aerodynamic fairing, and a cold stream inner shroud placed inside the outer shroud and co-operating therewith to define an annular flow passage for a cold stream (or secondary stream). The central spool of the turbojet is housed inside the inner shroud and it delivers a hot stream (or primary stream).

There are two main types of nacelle: nacelles that are fastened under an airplane wing, and nacelles that are fastened to the fuselage of an airplane (generally towards its tail). The invention relates more particularly to nacelles of the second type.

Compared with nacelles fastened under an airplane wing, nacelles mounted on an airplane fuselage have the particular feature that the inner and outer shrouds are in the form of single pieces or of half-shells. Access to the central spool for maintenance operations thus takes place through openings formed in the inner and outer shrouds, these openings being closed in operation by hatches that are screwed onto the respective shrouds.

Such a nacelle structure nevertheless presents certain drawbacks. In particular, in order to perform a maintenance operation on the central spool of the turbojet (e.g. for performing endoscopy, replacing spark plugs, or removing sensors), it is necessary in succession to open the maintenance covers in the aerodynamic fairing, to remove the hatches in the outer shroud, and to remove the access hatches in the inner shroud. The time required for maintenance is thus unduly lengthened because of these time-consuming operations. Furthermore, since maintenance technicians need to be able to access the central spool of the turbojet with standard tools and sometimes cold weather equipment, it is necessary to provide arrangements on the hatches that may make the turbojet heavier (e.g. providing them with large handles). Finally, the operation of installing/removing the hatches gives rise to risks of error during maintenance (e.g. putting a hatch back wrongly).

OBJECT AND SUMMARY OF THE INVENTION

A main object of the present invention is thus to mitigate such drawbacks by proposing a turbojet nacelle in which maintenance operations on the turbojet may be shortened and made more reliable.

This object is achieved by a nacelle for a bypass turbojet, the nacelle comprising:

an aerodynamic fairing;

a maintenance cover fastened to the aerodynamic fairing by means of at least one connection hinged about a longitudinal axis of the nacelle; and a cold stream inner shroud and a cold stream outer shroud placed concentrically inside the aerodynamic fairing so as to define between them a flow passage for a cold stream, the inner shroud having at least one opening closed by a removable access hatch;

wherein the outer shroud includes at least one opening closed by a removable access hatch that is fastened on the maintenance cover.

Compared with prior art nacelles, the nacelle of the invention presents the advantage of eliminating the operations of installing and removing the hatches in the outer shroud. This results in a saving of time during maintenance operations, and also to a reduction in the risk of errors and wrong manipulations during such operations.

The access hatch in the outer shroud may be fastened to the maintenance cover by means of at least one connecting rod. Under such circumstances, each connecting rod is preferably fastened to the access hatch of the outer shroud and to the maintenance cover by means of ball joints. This type of flexible connection thus makes it possible to accommodate relative movements that may occur between the outer shroud and the maintenance cover when closing the cover. Furthermore, each connecting rod is advantageously spring-mounted. The presence of springs thus serves to exert a compression force on the hatch in the outer shroud when closing the maintenance cover.

According to an advantageous arrangement of the invention, the nacelle further includes sealing means between the access hatch of the outer shroud and the opening formed in the outer shroud.

According to another advantageous arrangement of the invention, the nacelle further includes centering means for centering the access hatch of the outer shroud relative to the opening formed in the outer shroud.

The invention also provides an airplane bypass turbojet including a nacelle as defined above.

BRIEF DESCRIPTION OF THE DRAWINGS

Other characteristics and advantages of the present invention appear from the following description made with reference to the accompanying drawings that show an embodiment having no limiting character. In the figures.

DETAILED DESCRIPTION OF AN EMBODIMENT

Figure 1:
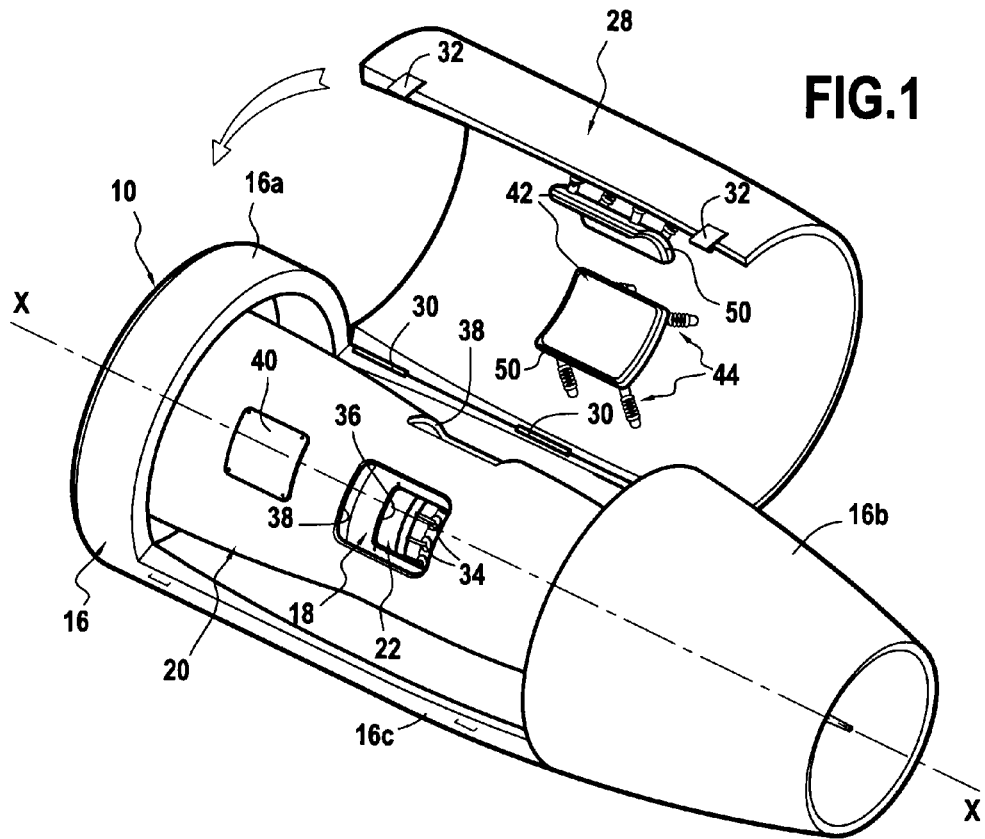
FIG. 1 is a perspective view of a turbojet nacelle of the invention.

The invention applies to any type of nacelle for a bypass turbojet, and it applies more particularly to nacelles that are fastened to the fuselage of an airplane towards its tail, as shown in the figures.

The nacelle 10 shown in the figures is fastened to the fuselage 12 of an airplane by means of a pylori 14. The nacelle comprises in particular an aerodynamic annular fairing 16, a cold stream inner shroud 18 and a cold stream outer shroud 20 that are substantially axially symmetrical about the longitudinal axis X-X of the nacelle.

The inner shroud 18 is centered on the longitudinal axis X-X and is placed around the central spool 22 of the turbojet (likewise centered on the axis X-X), this spool delivering a hot stream (or primary stream) not shown.

The outer shroud 20 is likewise centered on the longitudinal axis X-X and is placed around the inner shroud and co-operates therewith to define an annular passage for passing a cold stream 26 (or secondary stream) that is concentric around the flow passage for the hot stream.

Finally, the aerodynamic fairing 16 of the nacelle is centered on the longitudinal axis X-X and is placed around the outer shroud 20. In conventional manner, the aerodynamic fairing 16 is subdivided into an upstream fairing 16a surrounding the fan of the turbojet, a downstream fairing 16b generally housing a thrust reversal system, and a middle fairing 16c situated between the upstream and downstream fairings.

The middle fairing 16c gives access to the central portion of the turbojet in order to perform maintenance operations thereon. For this purpose, the middle fairing has a maintenance cover 28 that is fastened to the aerodynamic fairing 16 by connection means 30 hinged about the longitudinal axis X-X of the nacelle.

Figure 2:
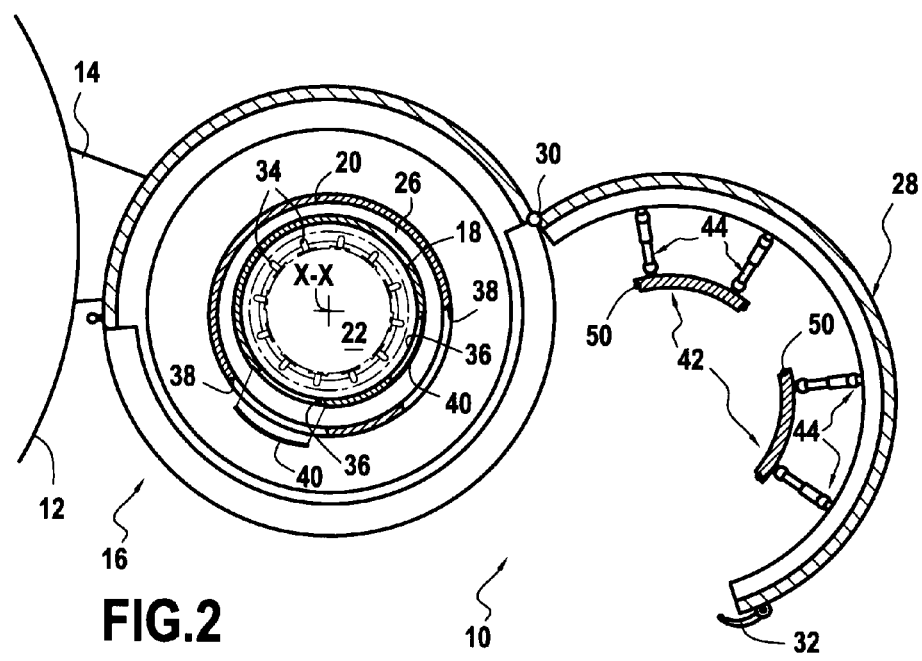
FIG. 2 is a cross-section view of the FIG. 1 nacelle.

As shown more clearly in FIG. 2, these connections 30 are diametrically opposite from the pylori 14 for fastening the nacelle to the fuselage of the airplane. The maintenance cover 28 can thus open by pivoting about these connections 30 so as to disengage a bottom access to the outer shroud 20 (FIG. 2). In the closed position, the maintenance cover is locked by means of fastener systems 32 (of the latch handle type) that are secured to the end of the maintenance cover remote from the connections 30.

Furthermore, in order to access the middle portion of the central spool 22 of the turbojet that houses numerous pieces of equipment that may require maintenance (such as for example the fuel injectors 34 shown in FIG. 1 and various sensors), the inner shroud 18 and the outer shroud 20 have respective openings 36 and 38 disposed in the bottom portion of the nacelle facing the maintenance cover 28.

Thus, in the embodiment of FIGS. 1 and 2, the inner shroud 18 has two openings 36 both of substantially rectangular shape that are circumferentially spaced apart from each other. These openings 36 give access in particular to the fuel injectors 34 of the turbojet.

Similarly, the outer shroud 20 also has two openings 38, both of rectangular shape, and substantially in radial alignment with the openings 36 in the inner shroud.

These openings 38 in the outer shroud give access to access hatches 40 that serve in operation to close the openings 36 formed in the inner shroud. In known manner, these hatches 40 are of shapes that correspond substantially to the shapes of the openings 36, and when they are mounted on the inner shroud they serve to reconstitute the inside wall of the flow passage for the hot stream 24.

The hatches 40 are fastened to the inner shroud 18, e.g. by means of screws (not shown) that can be removed by the person performing maintenance (thus making the access hatches removable). The hatches may be made easier to put into place and remove by fitting them with handles (not shown).

Each opening 38 in the outer shroud is itself closed by a removable access hatch 42 that is fastened to the maintenance cover 28. As a result, when the maintenance cover is opened in order to perform a maintenance operation on the turbojet (FIGS. 2 and 3), the hatches 42 that close the openings 38 in the outer shroud are automatically disengaged therefrom. Similarly, when the maintenance cover is closed after a maintenance operation, the hatches automatically close the openings in the outer shroud (FIG. 4).

To this end, the hatches 42 are of shapes that correspond substantially to the shapes of the openings 38 in the outer shroud and, when they close these openings, they serve to reconstitute the inside wall of the flow passage for the cold stream 26.

Furthermore, each hatch 42 is fastened to the maintenance cover 22 by means of a plurality of connecting rods 44 (a single connecting rod per hatch would suffice, but it is preferable for there to be one connecting rod connected to each corner of the hatch).

Figure 3:
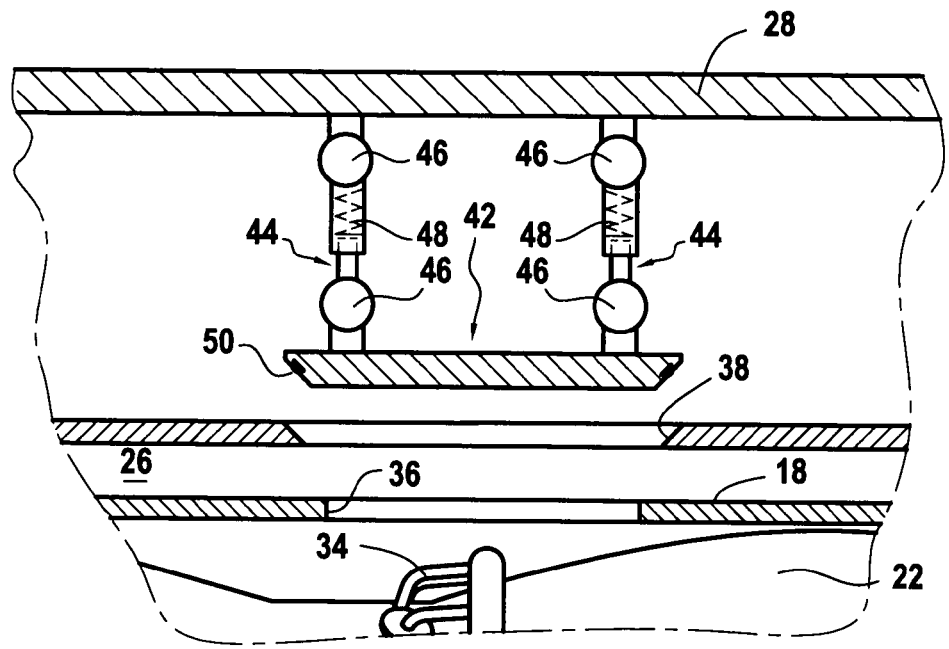
FIGS. 3 and 4 are enlarged views of an access hatch of the FIG. 2 nacelle, shown respectively in the open position and in the closed position.
Figure 4:
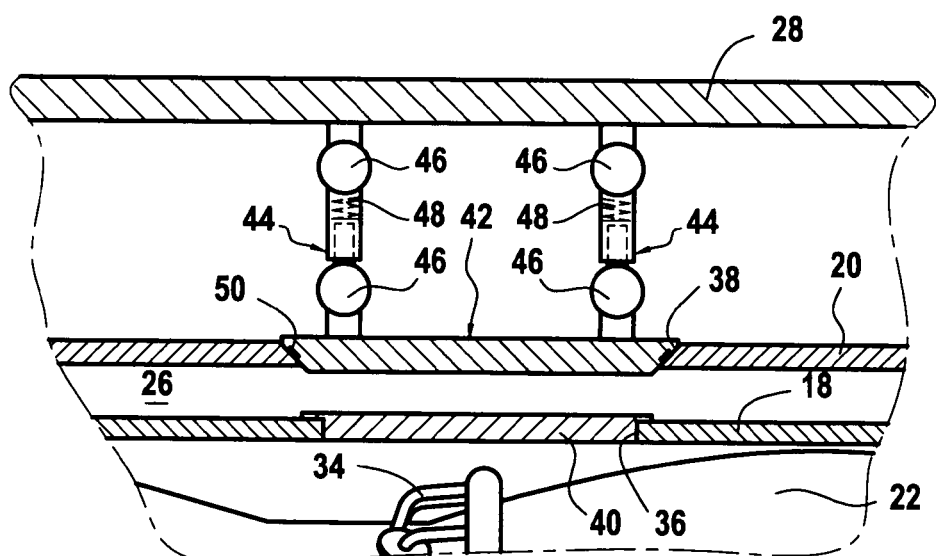

As shown more clearly in FIGS. 3 and 4, each connecting rod 44 is preferably fastened to the corresponding access hatch 42 and to the maintenance cover 28 by means of ball joints 46. Such flexible connections 46 thus serve to accommodate relative movements that may arise between the outer shroud 20 and the maintenance cover while it is being closed.

Furthermore, each connecting rod 44 is advantageously spring-mounted. Such springs 48 thus serve to exert a compression force on the access hatches 42 of the outer shroud when closing the maintenance cover.

In an advantageous arrangement of the invention, as shown in particular in FIGS. 3 and 4, provision is made to place sealing means between the access hatches 42 for the outer shroud and the corresponding openings 38 formed in the outer shroud. As shown in the figures, these means may be in the form of sealing gaskets 50 formed around the entire periphery of each of the access hatches. Other sealing means could naturally be envisaged.

In another advantageous arrangement of the invention, provision is made for centering means that center the access hatches 42 of the outer shroud relative to the corresponding openings 38 formed in the outer shroud. As shown in FIGS. 3 and 4, such means may be implemented by the edges of the access hatches flaring outwards, as to the corresponding edges of the openings in the outer shroud.

What is claimed is:

1. A nacelle for a bypass turbojet, the nacelle comprising:
    an aerodynamic fairing;
    a maintenance cover fastened to the aerodynamic fairing by means of at least one connection hinged about a longitudinal axis of the nacelle; and
    a cold stream inner shroud and a cold stream outer shroud placed concentrically inside the aerodynamic fairing so as to define between them a flow passage for a cold stream, the inner shroud having at least one opening closed by a removable access hatch;
    wherein the outer shroud includes at least one opening closed by a removable access hatch that is fastened on the maintenance cover.

2. A nacelle according to claim 1, wherein the access hatch in the outer shroud is fastened to the maintenance cover by means of at least one connecting rod.

3. A nacelle according to claim 2, wherein each connecting rod is fastened to the access hatch of the outer shroud and to the maintenance cover by means of ball joints.

4. A nacelle according to claim 2, wherein each connecting rod is spring-mounted.

5. A nacelle according to claim 1, further including sealing means between the access hatch of the outer shroud and the opening formed in the outer shroud.

6. A nacelle according to claim 1, further including centering means for centering the access hatch of the outer shroud relative to the opening formed in the outer shroud.

7. An airplane bypass turbojet including a nacelle according to claim 1.

* * * * *